UNITED STATES PATENT OFFICE 2,412,749

METHOD OF PREPARING NICOTINAMIDE

Edwin Frederic Pike and Robert S. Shane, Detroit, Mich., assignors, by mesne assignments, to Gelatin Products Corporation, Detroit, Mich., a corporation of Michigan No Drawing. Application March 2, 1942, Serial No. 433,056

1 Claim. (Cl. 260—295.5)

The present invention relates to the method of preparing nicotinamide.

This invention has as an object the preparation of nicotinamide by reacting nicotinic acid with dry $NH_3$ and eliminating water. A further object is to produce nicotinamide by contacting these two specified reactants under heat conditions and a sweeping gas whereby the water of reaction produced is removed immediately from the zone of reaction. Our invention also embraces the idea of employing dry ammonia for the dehydration of ammonium nicotinate where produced as an intermediate product in the reaction or where treated ab initio.

Heretofore nicotinamide is reported in the literature to have been made by (1) reacting nicotinyl chloride with ammonia and (2) reacting the esters of nicotinic acid with aqueous solutions of ammonia or gaseous $NH_3$, either at atmospheric pressure or at higher pressures and either at low temperatures or at moderately elevated temperatures. However in method 1 it is necessary first to prepare nicotinyl chloride from nicotinic acid by the use of such agents as thionyl chloride, phosphorus trichloride or pentachloride. In method 2 it is necessary to initially synthesize the ester from nicotinic acid or a derivative of this acid. In consequence thereof, by either of these methods the cost of the product is increased very materially over what would be the cost if nicotinic acid could be used directly with yields approximately of the same order.

We have now found that it is possible to produce nicotinamide in good yields by bringing a stream of dry ammonia gas into contact with nicotinic acid under the condition of elevated reaction temperatures. As dry ammonia gas is passed into nicotinic acid there first occurs a spontaneous evolution of heat. It is believed that ammonium nicotinate is an intermediate product formed in the carrying out of the complete reaction herein set forth and that this spontaneous evolution of heat is a consequence of its formation. Heat is applied to the reaction mixture and incipient liquefaction occurs around the point of introduction of the ammonia at about 160° C. With the continuance of the heating this liquefaction proceeds and as the temperature of reaction approaches 180–185° C. the entire mass becomes liquid. The dry ammonia gas is supplied in an amount in excess of that required to react with the provided quantity of the nicotinic acid and such excess is withdrawn from the reaction mass and carries with it the water which is evolved in the reaction. If the withdrawn ammonia gas is passed through a condenser it will be observed that when the temperature of reaction reaches 180–185° C. water is condensed from the withdrawn ammonia gas and that the amount of water substantially increases when the temperature reaches 230° C. It is desired to keep the reaction time as short as possible and yet not to raise the temperature so high as to produce undesirable decomposition. A temperature of around 230–235° C. has been found suitable.

While we do not wish to be bound by any theory of reaction, the mechanism of the reaction appears to be as follows: The $NH_3$ plays a double role. First, the ammonium salt of nicotinic acid is formed, which salt is then dehydrated by excess dry gaseous $NH_3$ in its second role to form nicotinamide. Heat is necessary for the successful conduct of the reaction. It is possible on the other hand that there is no intermediate formation of the ammonium salt and that the acid amide is formed in one stage.

The mechanism of the reactants involved may be expressed as follows:

A. In two stages

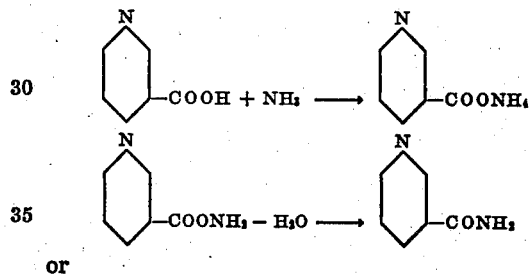

or

B. In one stage

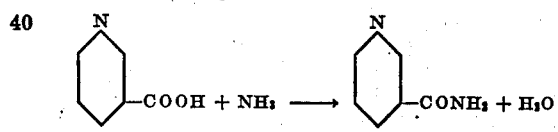

The temperatures which we have employed in the synthesis of nicotinamide employing nicotinic acid and dry $NH_3$ have varied from approximately 175° to approximately 300° C. at atmospheric pressure. Nicotinamide has been formed in experimental runs in all the temperatures intermediate between these temperatures. The progress of the reaction and the resultant yields are not of course the same throughout this range. A preferred temperature is in the neighborhood of 235° C. at atmospheric pressure. We are not limited to such preferred temperatures. We know from our experiments that the reaction does occur over the entire range of temperatures reported supra. The rate of reaction is, of course, both a function of the temperature and the amount of ammonia ($NH_3$). At the lower end of the temperature ranges specified, it takes longer for the reaction to go to completion. At the upper end of this range, the reaction proceeds more rapidly.

Heat alone may be sufficient to cause the dehydration of the ammonium nicotinate provided the water liberated is withdrawn from the reaction zone. It is believed that the dehydration of ammonium nicotinate to nicotinamide may be in equilibrium with the hydration of nicotinamide to ammonium nicotinate. Hence, the removal of the volatile constituent water from the reaction zone in a stream of an inert gas, whether ammonia or some other inert gas, will cause the progressive formation of nicotinamide at the expense of ammonium nicotinate.

Whereas ordinary atmospheric pressures are employed during heating, the reaction can be carried out under reduced pressure. When sub-atmospheric pressures are employed the temperatures will be lower. Every temperature between 175° and 300° C. will accordingly have a temperature corresponding thereto at a pressure below 760 millimeters. Also pressures above atmospheric may be employed provided water formed in the reaction can be removed.

It is usually desirable to separate and purify the nicotinamide from the reaction mixture. By one convenient procedure, when the reaction is concluded, the mixture containing the nicotinamide is rapidly cooled in a stream of inert gas, more particularly, dry ammonia gas to prevent deterioration from atmospheric oxygen and/or moisture. Following this, the reaction mixture is extracted with approximately four times its own weight of acetone. The acetone solution is decanted from the residue, if any, and to this solution is added approximately 5% by weight of calcium silicate. The mixture is now thoroughly stirred for a period of time to absorb unreacted nicotinic acid on the calcium silicate. The slurry is then filtered at room temperature, following which the acetone solution is concentrated to a point where nicotinamide crystallizes out. The slurry is filtered and the nicotinamide is dried.

By an alternative procedure which we have likewise found satisfactory, the reaction mixture after cooling in a stream of $NH_3$ or other inert gas such as nitrogen, one purpose of which is to exclude moisture containing air, is extracted with water. The nicotinamide may be recovered expediently from this solution after saturation with $NH_3$. The nicotinamide may then be recrystallized. We prefer to do this from dioxane and petroleum ether, although a large number of solvents, among which may be mentioned water, alcohol, and ammonium hydroxide may be used. We do not intend to limit the process to these specified solvents.

When employing the dioxane and petroleum ether, the following method with proportions set out is preferred. The nicotinamide is taken up in twice its own weight of hot dioxane then filtered. The solution is cooled and with constant agitation, one part by weight of petroleum ether (boiling between 30° and 60° C. although other fractions can likewise be used) is added. The nicotinamide precipitates out as a fine light yellow or pale tan, powder. The melting point of this material after one recrystallization is 126° C. A second recrystallization from the same solvent gave material melting at 129° C. (uncorrected). This material compares well in every respect with the available samples now on the market.

The following example will serve as illustrative of our invention:

*Example*

400 grams of nicotinic acid were put into a flask and dry ammonia gas in excess of the amount required to react with the provided quantity of nicotinic acid to form either ammonium nicotinate or nicotinamide was passed therethrough. Heat was applied until the temperature reached 230–235° C. and the mass was maintained at such temperature until the reaction was completed. Two to three hours were found sufficient to complete the reaction. The reaction product was allowed to cool while passing dry ammonia gas therethrough. The water of reaction was carried away by the excess of dry ammonia gas being passed through the mass. After the reaction was completed and the mass cooled extraction was accomplished in 700 cc. of warm water with agitation. A small amount of bone black and celite was then added, which is a standard method for decolorizing an organic solution. The mass was then filtered and the nicotinamide crystallized from the filtrate after saturation with ammonia at a lowered temperature. The yield of nicotinamide was 60% of the theoretical and the melting point was 128–129° C. uncorrected.

There are various procedures by which the nicotinic acid may be brought into intimate contact with dry $NH_3$. Our invention is not limited to any manipulative operation or method. Furthermore there are various ways the impure nicotinamide initially produced may be purified. As many different embodiments of this invention may be made without departing from the spirit and scope thereof, it is to be understood that we do not limit ourselves to the specific embodiments thereof except as defined in the appended claim. It is also to be understood that temperatures at sub- or super-atmospheric pressures corresponding to the range 175–300° C. at atmospheric pressures are to be accorded applicants as within the true interpretation of the claim.

What we claim:

The process of preparing nicotinamide comprising contacting nicotinic acid with a stream of dry ammonia gas at a temperature sufficiently high to liberate the water of reaction, supplying said ammonia gas during the reaction in an amount in substantial excess over that required to react with the nicotinic acid, continuously sweeping such excess of gas through the reaction product, said gas excess carrying with it the water of reaction as the same is formed, rapidly cooling the reaction product in a stream of dry ammonia gas, dissolving the reaction product in water, and saturating the aqueous solution with ammonia to reprecipitate the nicotinamide.

ROBERT S. SHANE.
EDWIN FREDERIC PIKE.